(12) United States Patent
Kurcik et al.

(10) Patent No.: US 11,431,178 B2
(45) Date of Patent: Aug. 30, 2022

(54) BATTERY SYSTEM

(71) Applicant: SAMSUNG SDI CO., LTD., Yongin-si (KR)

(72) Inventors: Peter Kurcik, Sausal (AT); Maximilian Hofer, Hartberg (AT)

(73) Assignee: Samsung SDI Co., Ltd., Yongin-si (KR)

( * ) Notice: Subject to any disclaimer, the term of this patent is extended or adjusted under 35 U.S.C. 154(b) by 233 days.

(21) Appl. No.: 16/667,179

(22) Filed: Oct. 29, 2019

(65) Prior Publication Data
US 2020/0136400 A1 Apr. 30, 2020

(30) Foreign Application Priority Data

Oct. 30, 2018 (EP) .................................... 18203308
Oct. 29, 2019 (KR) ........................ 10-2019-0135417

(51) Int. Cl.
*H02J 7/00* (2006.01)

(52) U.S. Cl.
CPC ........ *H02J 7/0016* (2013.01); *H02J 7/00718* (2020.01)

(58) Field of Classification Search
USPC ......................................................... 320/122
See application file for complete search history.

(56) References Cited

U.S. PATENT DOCUMENTS

| 5,557,188 A | 9/1996 | Piercey | |
| 5,804,944 A * | 9/1998 | Alberkrack | ........... H02J 7/0021 |
| | | | 320/163 |
| 6,100,668 A * | 8/2000 | Takano | ................. H02J 7/0071 |
| | | | 320/148 |
| 8,217,628 B2 * | 7/2012 | Yang | ..................... H02J 7/0072 |
| | | | 320/134 |
| 9,234,943 B2 * | 1/2016 | Fabregas | ............... G01R 31/382 |
| 2014/0359373 A1 * | 12/2014 | Hoffknecht | ......... G06F 11/0745 |
| | | | 714/43 |
| 2018/0233928 A1 * | 8/2018 | Li | ........................ H01M 10/482 |

FOREIGN PATENT DOCUMENTS

| DE | 102011088359 A1 * | 6/2013 | ............... H02H 7/18 |
| EP | 2 629 392 A1 | 8/2013 | |
| EP | 3 327 825 A1 | 5/2018 | |

OTHER PUBLICATIONS

European Office action dated Mar. 12, 2020.
Extended European Search Report dated Feb. 11, 2019 corresponding to European Patent Application No. 18203308.4.

* cited by examiner

*Primary Examiner* — Samuel Berhanu
(74) *Attorney, Agent, or Firm* — Lee IP Law, P.C.

(57) ABSTRACT

A battery system includes a solid state switch (SSS), and a battery management system (BMS) including a gate driver and a shunt circuit. The SSS and the BMS share at least one module that is used for both the SSS and the BMS. The at least one module includes at least one of the gate driver and the shunt circuit.

10 Claims, 6 Drawing Sheets

BATTERY SYSTEM

CROSS-REFERENCE TO RELATED APPLICATION

European Patent Application No. 18203308.4, filed on Oct. 30, 2018, in the European Patent Office, and entitled: "A Battery System," is incorporated by reference herein in its entirety.

BACKGROUND

1. Field

Example embodiments relate to a battery system including a solid state switch
(SSS) and a battery management system (BMS).

2. Description of the Related Art

In the recent years, electric vehicles using electric power as a power source for motion have been developed. The electric vehicles may be an automobile that is propelled by an electric motor using energy stored in rechargeable batteries. The electric vehicles may be solely powered by batteries or may be powered in hybrid form, which uses the batteries and a gasoline generator. Furthermore, the electric vehicles may be propelled in hybrid form, which uses an electric motor and a conventional combustion engine. In general, an electric-vehicle battery (EVB) or a traction battery may be a battery to supply power for propulsion of battery electric vehicles (BEVs). Electric-vehicle batteries may differ from starting, lighting, and ignition batteries because the Electric-vehicle batteries are designed to supply a propulsion power of battery electric vehicles (BEVs). A rechargeable or secondary battery, repeatedly charged and discharged, may differ from a primary battery, which operates in only an irreversible conversion of chemical to electrical energy. Low-capacity rechargeable batteries may be used as power supply for small electronic devices, e.g., cellular phones, notebook computers and camcorders, while high-capacity rechargeable batteries may be used as power supply for hybrid vehicles and the like.

In general, rechargeable batteries may include an electrode assembly including a positive electrode, a negative electrode, and a separator interposed between the positive and negative electrodes, a case for accommodating the electrode assembly, and an electrode terminal electrically connected to the electrode assembly. An electrolyte solution may be injected into the case for charging and discharging of the battery via an electrochemical reaction of the positive electrode, the negative electrode, and the electrolyte solution. The shape of the case, e.g. cylindrical or rectangular, may be changed according to the battery's intended purpose. Lithium-ion or lithium polymer batteries, which are widely used in laptops and consumer electronics, may be used in electric vehicles.

Rechargeable batteries may be used as a battery module including a plurality of unit battery cells that are coupled in series and/or in parallel so as to provide a high energy density, e.g., for motor driving of a hybrid vehicle. For example, the battery module may be formed by interconnecting electrode terminals of the plurality of unit battery cells according to a required amount of power.

A battery pack may be a set of various number of battery modules. The batter modules may be formed in a series, parallel or a mixture of series and parallel connections to deliver the desired voltage, capacity, or power density. Components of the battery packs may include the individual battery modules, and the interconnects, which provide electrical conductivity therebetween.

As a static control of a battery power output operation and a batter charging operation may not satisfy dynamic power demands of various consumers regarding the battery system sufficient, steady exchange of information between the battery system and controllers of the electrical consumers may be required. The information may include actual state of charge (SoC), potential electrical performance, charging ability and internal resistance of the battery system as well as actual or predicted power demands or surpluses of the consumers.

Battery systems may include a battery management system (BMS) and/or battery management unit (BMU) for processing the aforementioned information. The BMS/BMU may communicate to the controllers of the various electrical consumers via a suitable communication bus, e.g. a serial peripheral interface (SPI) or a controller area network (CAN) interface. The BMS/BMU may further communicate with each of the battery submodules, particularly with a cell supervision circuit (CSC) of each battery submodule. The CSC may be further connected to a cell connection and a sensing unit (CCU) of a battery submodule that interconnects the battery cells of the battery submodule.

Thus, the BMS/BMU may be provided for managing the battery pack, e.g., by protecting the battery from operating outside its safe operating area, monitoring its state, calculating secondary data, reporting that data, controlling its environment, authenticating it and/or balancing it.

Relays may control the connections of the battery cells and power supply of the battery cells. Original equipment manufacturers (OEMs) have been more and more requesting solutions based on metal-oxide-semiconductor field-effect transistors (MOSFET) switches.

SUMMARY

Embodiments are directed to a battery system including a solid state switch (SSS), and a battery management system (BMS) including a gate driver and a shunt circuit. The SSS and the BMS may share at least one module that is used for both the SSS and the BMS, and the at least one module may include at least one of the gate driver and the shunt circuit.

The at least one of the gate driver and the shunt circuit may be to control the SSS.

The SSS may include at least one field-effect transistor FET.

The SSS may include at least one set of anti-serially interconnected FETs that is interconnected FETs including a first FET and a second FET. Gate electrodes of the first and second FETs may be electrically interconnected to each other. Source electrodes of the first and second FETs may be electrically interconnected to each other. A drain electrode of the first FET may be electrically connected to a first terminal. A drain electrode of the second FET may be electrically connected to a second terminal. The gate driver of the BMS may be connected with the SSS via a first driving line and a second driving line. The first driving line may be connected with gate electrodes of the first and second FETs. The second driving line may be connected with the source electrodes of the first and second FETs.

The gate electrode of the first FET may be electrically connected to the first driving line via a gate resistor. The source electrode of the first FET may be electrically connected to the second driving line directly. A gate-to-source resistor may be between the source electrode and the gate electrode of the first FET.

A resistor, a diode, and a capacitor may be connected between the first driving line and the second driving line in parallel. A cathode of the diode may be connected to the first driving line. An anode of the diode may be connected to the second driving line.

The gate driver and the shunt circuit may be arranged in the BMS. The gate driver has sensing pins. Two terminals of the shunt circuit may be connected to the sensing pins of the gate driver, respectively.

The battery system may further include a current measurement circuit including the shunt circuit in the BMS. The current measurement circuit may be shared with the SSS and the BMS.

The current measurement circuit may include a first part and a second part. The first part may be connected to the shunt circuit through shunt terminals and performs a first current measurement to generate a first measured signal. The second part may be connected to the shunt circuit through the shunt terminals and perform a second current measurement to generate a second measured signal.

The first measured signal may be used for controlling the BMS, and the second measured signal is used for controlling the SSS.

An output signal of a first opamp of the second part may control the gate driver of the BMS such that the gate driver of the BMS drives the SSS.

A cascade connection of opamps may provide a fast signal for the gate driver of the BMS and provides at least one filter with a low corner frequency for the second part of the current measurement circuit.

The cascade connection of the opamps may further include at least one second opamp that is cascaded and connected to an output of the first opamp via a current sensing terminal. The second opamp may form at least one filter by connecting the second opamp to the first opamp in a cascade.

The at least one module may include a serial communication interface.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
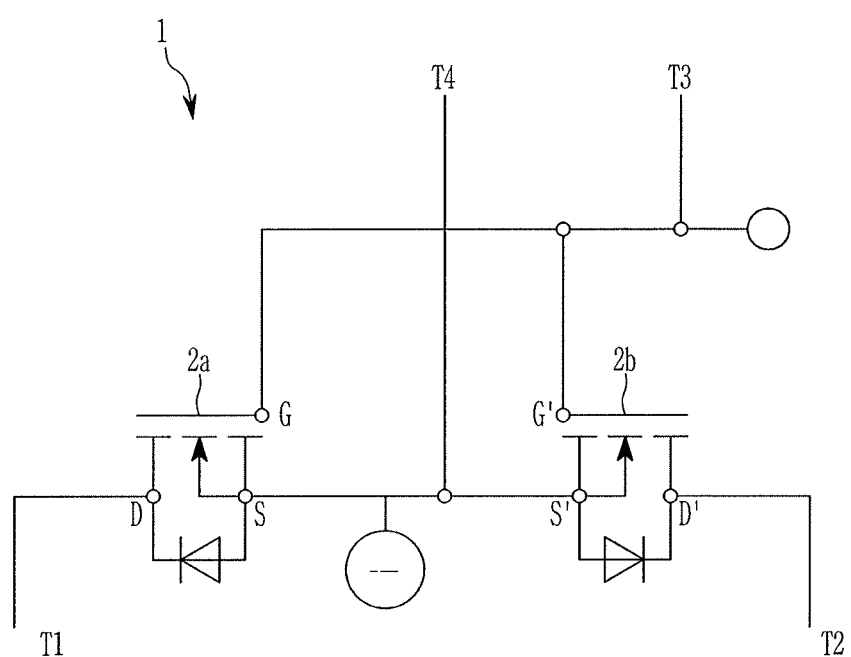
FIG. 1 illustrates a solid state switch according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it may be directly on the other layer or substrate, or intervening layers may also be present. Further, it will be understood that when a layer is referred to as being "under" another layer, it may be directly under, and one or more intervening layers may also be present. In addition, it will also be understood that when a layer is referred to as being "between" two layers, it may be the only layer between the two layers, or one or more intervening layers may also be present. Like reference numerals refer to like elements throughout.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions may be omitted. As used herein, the term "and/or" may include any and all combinations of one or more of the associated listed items. Further, the use of "may" when describing embodiments refers to "one or more embodiments."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the example embodiments.

In the following description of embodiments, the terms of a singular form may include plural forms unless the context clearly indicates otherwise. It will be further understood that the terms "include," "comprise," "including," or "comprising" specify a property, a region, a fixed number, a step, a process, an element, a component, and a combination thereof but may not exclude other properties, regions, fixed numbers, steps, processes, elements, components, and combinations thereof.

Features of the example embodiments and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. Further, the example embodiments may be embodied in various different forms, and may not be construed as being limited to only the illustrated embodiments herein. Rather, these embodiments may be provided as examples so that this disclosure will be thorough and complete, and will fully convey the aspects and features of the example embodiments. Accordingly, processes, elements, and techniques that are not necessary for a complete understanding of the aspects and features of the example embodiments may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the scope of the example embodiments.

Spatially relative terms, e.g., "beneath," "below," "lower," "under," "above," "upper," and the like, may be used herein for ease of explanation to describe one element or feature's relationship to another element(s) or feature(s) as illustrated in the figures. It may be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" may encompass both an orientation of above and below. The device may be otherwise oriented (e.g., rotated 90 degrees or at other orientations) and the spatially relative descriptors used herein may be interpreted accordingly.

It will be understood that when an element or layer is referred to as being "on," "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The terminology used herein may be for the purpose of describing particular embodiments only and should not be intended to be limiting of the example embodiments. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but may not preclude the presence or addition of one or more other features, integers, steps, operations, elements, components, and/or groups thereof. As used herein, the term "and/or" may include any and all combinations of one or more of the associated listed items. Expressions, e.g., "at least one of," when preceding a list of elements, modify the entire list of elements and may not modify the individual elements of the list.

As used herein, the term "substantially," "about," and similar terms may be used as terms of approximation and not as terms of degree, and may be intended to account for the inherent deviations in measured or calculated values. Further, if the term "substantially" is used in combination with a feature that could be expressed using a numeric value, the term "substantially" may denote a range of +/−5% of the value centered on the value. Further, the use of "may" when describing embodiments refers to "one or more embodiments." Herein, the terms "upper" and "lower" may be defined according to the z-axis. For example, the cover is positioned at the upper part of the z-axis, whereas the ground plate is positioned at the lower part thereof.

The electronic or electric devices and/or any other relevant devices or components according to embodiments described herein may be implemented utilizing hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions may be stored in a memory that is implemented in a computing device using a standard memory device, e.g., a random access memory (RAM). The computer program instructions may also be stored in other non-transitory computer readable media, e.g., a CD-ROM, flash drive, or the like. Also, a person of skill in the art may recognize that the functionality of various computing devices may be combined or integrated into a single computing device, or the functionality of a particular computing device may be distributed across one or more other computing devices without departing from the scope of the exemplary embodiments.

Unless otherwise defined, all terms including technical and scientific terms used herein may have the same meaning as commonly understood. It will be further understood that terms, e.g., those defined in commonly used dictionaries, may be interpreted as having a meaning that is consistent with their meaning in the context of the relevant art and/or the present specification, and may not be interpreted in an idealized or overly formal sense, unless expressly so defined herein.

A solid state switch (SSS), e.g. a solid state relay (SSR) or a solid state contactor (SSC), may be a microelectronic device based on semiconductor technology. In contrast to conventional electro-mechanical switching technologies (i.e. conventional relays), solid state switches may require no moving parts and allow absolutely quite operations. Due to their higher shock and vibration resistance they may be ideal for application in harsh environments and allow ultra-fast switching times to control signals that have a width less than, e.g., 100 μs. Further, other kinds of SSS may also be used. For example, SSSs based on micro-electro-mechanical systems (MEMS) or micro-electro-opto-mechanical systems (MOEMS) may be used.

The SSS may include at least one field-effect transistor (FET). A FET may be a microelectronic transistor including a gate electrode, a source electrode, and a drain electrode. The microelectronic transistor may use an electric field, which is applied between the gate electrode and the source electrode and may control electrical conductivity between the drain electrode and the source electrode. Further, the SSS may be different kinds of FETs. For example, the FET may be a metal-oxide-semiconductor field-effect transistor (MOSFET). Further, the FET may be a rear surface contact MOSFET that include a drain electrode on a rear surface thereof and gate and source electrodes on a top surface thereof. For example, the gate, source, and drain electrodes of the FET may be electrically connected to other elements by physically contacting external contacts, by soldering, electrically conductive gluing, or by wiring (e.g. via wire bonds). In an example embodiment, a SSS may be implemented with individual switching devices or switching elements (e.g. a FET) using a wiring scheme for connecting the individual switching devices or the switching elements.

FIG. 1 illustrates a solid state switch (SSS) according to an embodiment. Referring to FIG. 1, the solid state switch (SSS) 1 may include a first FET 2a and a second FET 2b that are anti-serially interconnected. For example, a source electrode S of the first FET 2a may be connected to a source electrode S' of the second FET 2b. Further, a gate electrodes G of the first FETs 2a may be connected to a gate electrode G' of the second FET 2b. Further, a drain electrode D of the first FET 2a may be spaced apart from a drain electrode D' of the second FET 2b. In an example embodiment, the drain electrode D of the first FET 2a may be electrically connected to a first terminal T1, and the drain electrode D' of the second FET 2b may be electrically connected to a second terminal T2. The gate electrodes G and G' of the first and second FETs 2a and 2b may be connected to a third terminal T3. The source electrodes S and S' of the first and second FETs 2a and 2b may be connected to a fourth terminal 14. For example, both the first and second FETs 2a and 2b may be controlled by applying a gate voltage to the gate electrodes G and G' of the first and second FETs 2a and 2b.

In another embodiment, the solid state switch (SSS) 1 may include two or more sets of anti-serially interconnected FETs. Each set of the anti-serially interconnected FETs may include a first FET and a second FET. The first and second FETs may include gate electrodes electrically interconnected to each other, source electrodes electrically interconnected to each other, and drain electrodes of the first and second FETs electrically separated from each other. For example, the gate electrodes of the first and second FETs may be connected to the gate electrode of the second FET, and the source electrode of the first FET may be connected to the source electrode of the second FET. Further, the drain electrode of the first FET may be connected to a first terminal T1, and the drain electrodes of the second FETs may be electrically connected to a second terminal T2. For example, the gate electrodes of the first and second FETs may be connected to a third terminal T3, and the source electrodes of the first and second FETs may be connected to a fourth terminal 14.

For example, two or more solid state switches may be connected to each other in parallel. Thus, the drain electrodes of the first FETs of the anti-serially interconnected FETs may be electrically connected to the first terminal T1, and the drain electrodes of the second FETs of the anti-serially interconnected FETs may be electrically connected to the second terminal T2. Further, the gate electrodes of the first and second TETs of the anti-serially interconnected FETs may be electrically interconnected to the third terminal T3, and the source electrodes of the first and second TETs of the anti-serially interconnected FETs may be electrically interconnected to the fourth terminal T4.

Figure 2:
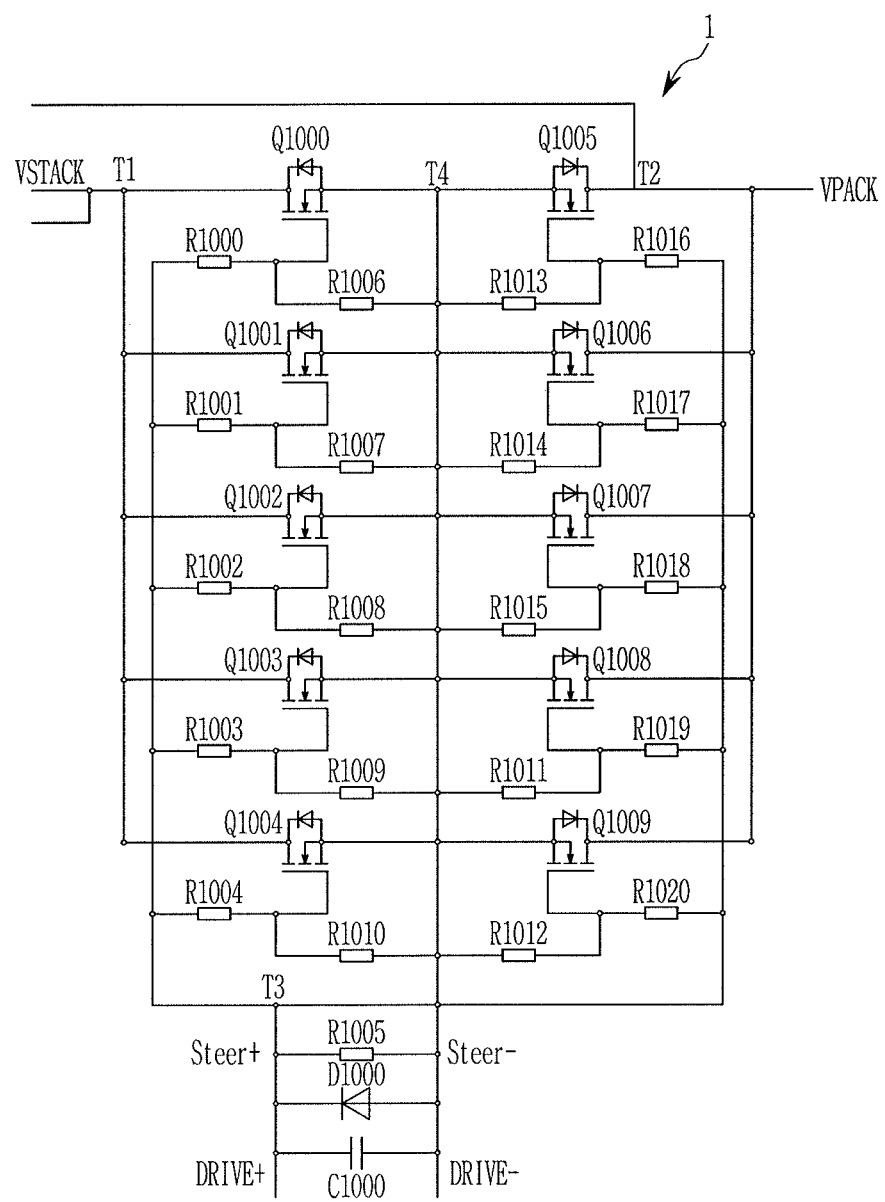
FIG. 2 illustrates a solid state switch as a power stage according to an example embodiment.

FIG. 2 illustrates a solid state switch (SSS) 1 as a power stage according to an example embodiment. Referring to FIG. 2, the solid state switch (SSS) 1 may include five sets of anti-serially interconnected FETs. Each set may include a first FET and a second FET. For example, gate electrodes of the first and second FETs Q1000 to Q1009 of the five sets of anti-serially interconnected FETs may be electrically connected to a first driving line DRIVE+ via gate resistors R1000, R1001, R1002, R1003, R1004, R1016, R1017, R1018, R1019, and R1020 (e.g., 10 k ohm value).

For example, source electrodes of the first and second FETs Q1000 to Q1009 of the five sets of anti-serially interconnected FETs may be electrically connected to a second driving line DRIVE− directly. For example, the source electrodes of the first and second FETs Q1000 to Q1009 of the five sets of anti-serially interconnected FETs may be electrically connected to the second driving line DRIVE− without passive resistors. The first and second FETs Q1000 to Q1009 of the five sets of anti-serially interconnected FETs may have gate-to-source resistors R1006, R1007, R1008, R1009, R1010, R1011, R1012, R1013, R1014, and R1015 (e.g., 10 k ohm value) between the source electrodes and the gate electrodes thereof.

For example, five drain electrodes of the first FETs may be electrically connected to the first terminal T1, to which a voltage $V_{STACK}$ at a positive end of a cell stack is applied. Five drain electrodes of the second FETs may be electrically connected to the second terminal T2, to which a voltage $V_{PACK}$ at a positive output terminal of a battery pack is applied. For example, ten gate electrode of the first and second FETs may be electrically connected to the third terminal T3. Ten source electrodes of the first and second FETs may be electrically connected to the fourth terminal T4. According to an example embodiment, gate resistors (e.g., R1000-R1004 and R1016-R1020) may limit a gate current when the first and second FETs Q1000 to Q1009 are turned ON and OFF. For example, values of the gate resistors R1000-R1004 and R1016-R1020 may be changed according to a gate driver design. Further, the gate-to-source resistors R1006-R1015 may be used to turn off the first and second FETs Q1000 to Q1009 when driving lines are floated, e.g., due to a circuit failure.

Further, referring to FIG. 2, a resistor R1005 (e.g., 10 k ohm value), a diode D1000 (e.g., 16V as a breakdown voltage) and a capacitor C1000 (e.g., 100 nF) may be connected in parallel between the first driving line Drive+ and the second driving line Drive−. A cathode of the diode D1000 may be connected to the first driving line Drive+, and an anode of the diode D1000 may be connected to the second driving line Drive−. A circuit including the resistor R1005, the diode D1000 and the capacitor C1000 may be a part of a gate driver.

The components in the circuit may have following functions. For example, the resistor R1005 (e.g., 10 k ohm value) may have the same function as the gate-to-source resistors (R1006-1015) between the gate electrodes and source electrodes of the first and second FETs and may be used when more redundancy regarding resistor is required. Alternatively, when more redundancy regarding resistor is not required, some or all of the gate-to-source resistors (R1006-1015) may be omitted because the resistor R1005 (e.g., 10 k ohm value) may be used to perform the same function as the gate-to-source resistors (R1006-1015). Further, the resistor R1005 may have different values.

The diode D1000 may be either Zener diode or transient voltage suppressor (TVS). A function of the diode D100 may is to maintain gate-source voltages of the first FETs below a predetermined amount, e.g., 20V. For example, the gate-source voltages of the first FETs are changed, and, a maximum gate-source voltage of each of the first FETs may be 20V. For example, when a voltage, which is greater than the maximum gate-source voltage (e.g., 20V), is applied between the gate electrode and the source electrode of each of the first FETs, the first FETs may be damaged. For example, the diode D1000 may protect the first and second FETs from voltage spikes, e.g., electrostatic discharge (ESD) pulses. A function of the capacitor C1000 may be to absorb energy of the ESD pulses (e.g., 16V) with the diode D1000 and to ensure that the power stage may not be destroyed by the ESD pulses. For example, the diode D1000 and the capacitor C1000 may be considered as ESD protection components. The ESD protection components may be required when the power stage is physically separated from the gate driver. For example, when the power stage, e.g., the solid state switch (SSS) 1 is interconnected to the gate driver, the ESD protection components may be arranged close to the power stage, e.g., the solid state switch (SSS) 1.

In an example embodiment, a driver may require an over current protection (OCP) for protecting MOSFETs. The OCP may be performed by measuring drain-source voltages $V_{DS}$ of the MOSFETs or a separate shunt circuit in the power stage in series with the MOSFETs. By measuring the drain-source voltages $V_{DS}$, voltage drops between drain and source electrodes of the MOSFETs may be obtained. For example, currents passing through the MOSFETs may be calculated from the voltage drops between drain and source electrodes of the MOSFETs using "on" state resistances of the MOSFETs. A shunt circuit, e.g., a current sense resistor, a shunt resistor or an obsolete resistor, may be a low-resistance electrical measuring resistor for measuring an amount of current flowing therethrough. The current flowing through the shunt circuit may cause a voltage drop to the shunt circuit that is proportional to the amount of the current.

Figure 3:
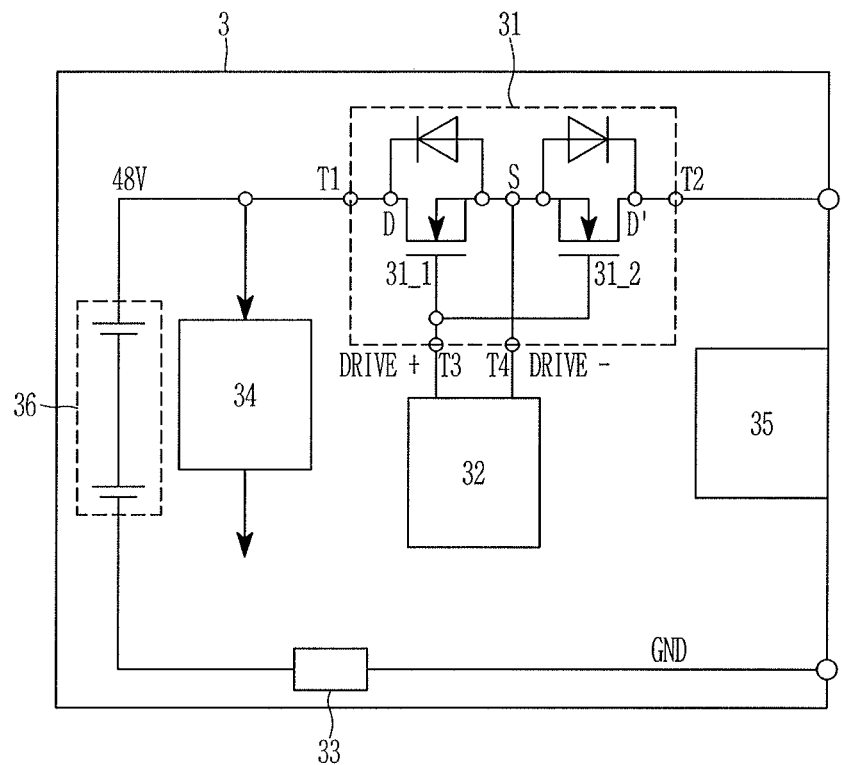
FIG. 3 illustrates a switching system according to an example embodiment.

FIG. 3 illustrates a switching system 3. The switching system 3 may include at least the solid state switch 31 and a gate driver 32. The switching system 3 may further include additional circuits for a current protection, a serial communication interface, etc.

Referring to FIG. 3, the solid state switch (SSS) 31 in the switching system 3 may include a first FET 31_1 and a second FET 31_2. Further, a separate shunt circuit 33 may be provided in series with the first and second FETs 31_1 and 31_2. The shunt circuit 33 may measure an amount of current flowing through the first and second FETs 31_1 and 31_2 of the solid state switch (SSS) 31. The first and second FETs 31_1 and 31_2 may be MOSFETs. The gate driver 32 may drive the solid state switch (SSS) 31. A first driving line DRIVE+ from the gate driver 32 may be connected with gate electrodes of the first and second FETs 31_1 and 31_2. A second driving line DRIVE− from the gate driver 32 may be connected with source electrodes of the first and second FETs 31_1 and 31_2.

In an example embodiment, the switching system 3 may further include a power source 36 (e.g., 48V), a DC/DC converter 34 connected with a first terminal T1, a shunt circuit 33 connected between a negative terminal of the power source 36 and GND, a controller area network (CAN) interface 35 connected between a second terminal T2 and one terminal of the shunt circuit 33 connected to GND. Another terminal of the shunt circuit 33 may be connected to the negative terminal of the power source 36. The positive terminal of the power source 36 may be connected with the first terminal T1 and the DC/DC converter 34. For example, the DC/DC converter 34 may be an electronic circuit or an electromechanical device that converts a source of direct current (DC) from one voltage level to another voltage level. For example, the DC/DC converter 34 may be a type of electric power converter. Power levels of the DC/DC converter 34 may range from very low to very high. For example, when the power source has a low level energy, the DC/DC converter 34 may output a low lever power, and when the power source has a high level energy, the DC/DC converter 34 may output a high level power. For example, the switching system 3 including a solid state switch (SSS) 31, a gate driver 32, and optionally some other components or modules, may be provided independently or share some modules with a battery management system (BMS). For example, FIG. 3 illustrates a standalone switching system, but some of the modules may be shared with a BMS when there is already this functionality in the BMS. For example, a current measurement circuit may be used for an overcurrent protection module and serial communication interfaces.

Figure 4:
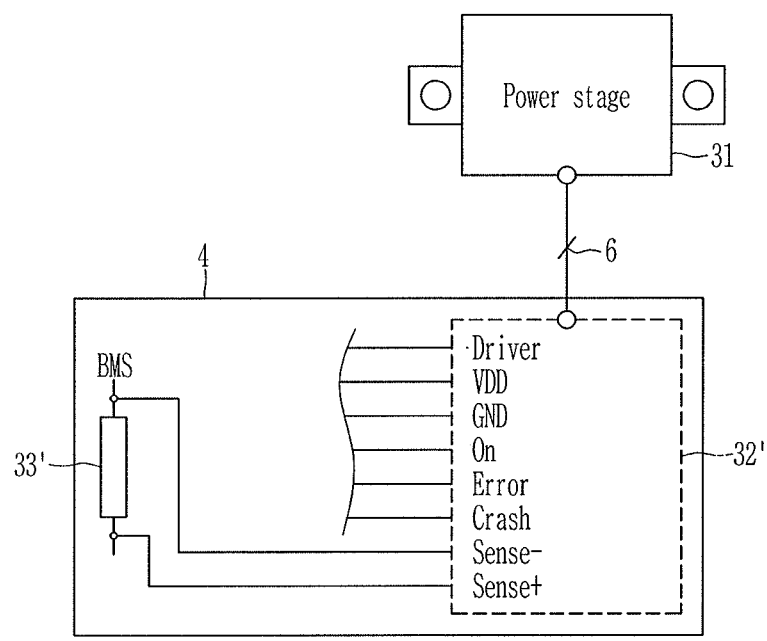
FIG. 4 illustrates a battery system including a power stage (e.g., a solid state switch) and a battery management system according to an example embodiment.

FIG. 4 illustrates a battery system including a power stage, e.g., a solid state switch (SSS) 31, and a battery management system (BMS) 4. For example, the battery management system (BMS) may be an electronic system that manages a rechargeable battery, a battery cell, or a battery pack, e.g., by protecting the rechargeable battery from operating outside its safe operating area, monitoring its state, calculating secondary data, reporting that data, controlling its environment, authenticating it and/or balancing it.

Referring to FIG. 4, the battery management system (BMS) 4 may include a shunt circuit 33' and a gate driver 32'. For example, the gate driver 32' of the battery management system (BMS) 4 may have pins VDD, GND, On, Error, Crash, Sense−, and Sense+. For example, two terminals of the shunt circuit 33' may be connected to the pins Sense− and Sense+ of the gate driver 32', respectively. For example, the pins of the gate driver 32' may include less or more pins.

Referring to FIGS. 3 and 4, as each of a switching system 3 and a battery management system (BMS) 4 may include a shunt circuit and a gate driver among modules used for a power stage 31, e.g., a solid state switch (SSS). In other words, referring to FIG. 3, the switching system 3 may include the shunt circuit 33 and the gate driver 32. Referring to FIG. 4, the battery management system (BMS) 4 may include the shunt circuit 33' and the gate driver 32'. For example, when the gate driver and/or the shunt circuit may be shared by the switching system 3 (including the solid state switch (SSS) 31) and the BMS 4, it may reduce the cost of the a battery system. Further, FIG. 4 illustrates that the gate driver 32' of the BMS is connected with the power stage 31, e.g., the solid state switch (SSS) via a connection 6.

Figure 5:
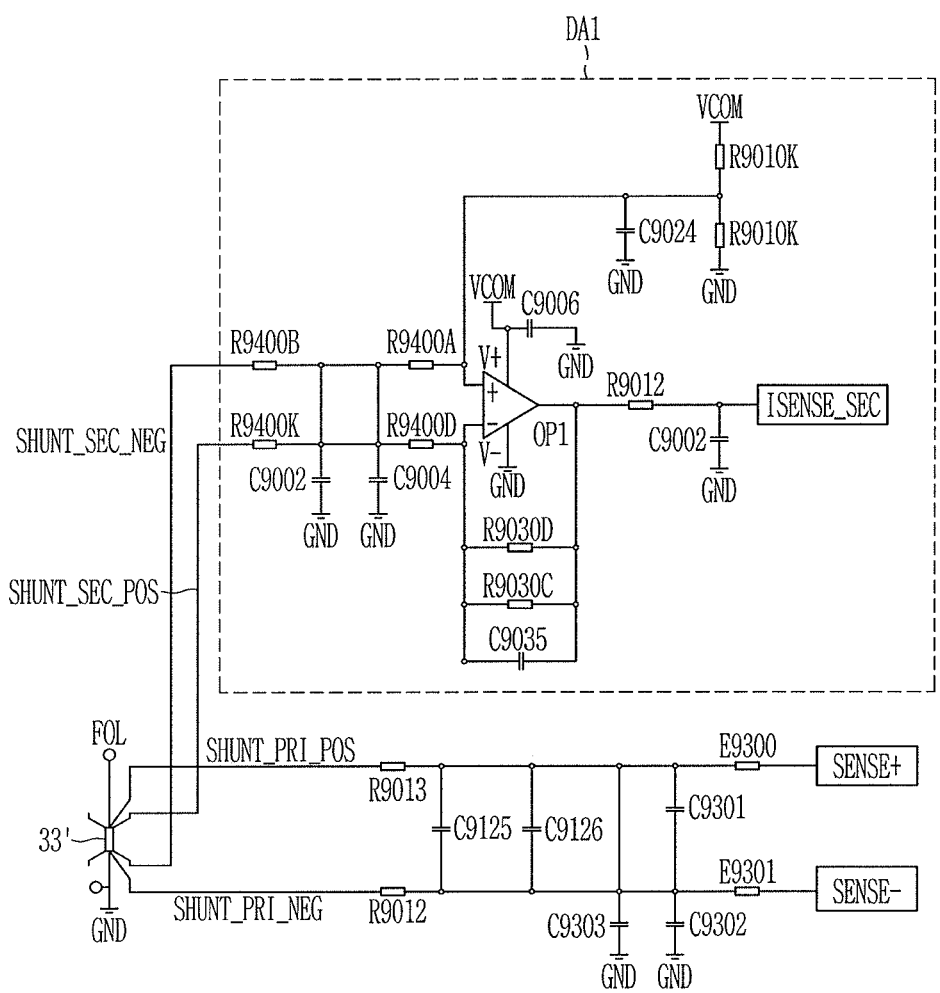
FIG. 5 illustrates a circuit for current measurement according to an example embodiment.

FIG. 5 illustrates a circuit for current measurement according to an example embodiment. The circuit for the current measurement in FIG. 5 may include two parts. For example, the circuit for the current measurement may be used for an operation of the BMS.

Referring to FIG. 5, the first part (i.e., a lower part) of the circuit connected to the shunt circuit 33' at terminals SHUNT_PRI_POS and SHUNT_PRI_NEG, may be called as a primary channel used for a first current measurement, which may be fed into an application specific integrated circuit (ASIC) which provides rest of the functions for very accurate current measurement. Two terminals of the shunt circuit 33' of the BMS 4 may be connected to the pins Sense+ and Sense− of the gate driver 32' of the BMS respectively via a circuit including resistors and capacitors. For example, a signal from the shunt circuit 33' may be transferred to the gate driver 32' through the terminals SHUNT_PRI_POS and SHUNT_PRI_NEG of the first part (e.g., through the first channel). The transferred signal through the first channel may be accurately measured by the ASIC. The measured signal may be used for controlling the driver 32' of the BMS.

The second part (the upper part) of the circuit, connected to the shunt circuit 33' at terminals SHUNT_SEC_POS and SHUNT_SEC_NEG may be called as a secondary channel used for a second current measurement, which provides redundant current measurement capability for safety reasons. For example, the second part may include a differential amplifier DA1 including an opamp OP1 and resistors. Outputs of the differential amplifier DA1 of the secondary channel may be measured by an analog to digital converter. For example, a signal from the shunt circuit 33' may be transferred to the differential amplifier DA1 through the terminals SHUNT_SEC_POS and SHUNT_SEC_NEG (i.e., through the second channel). The transferred signal through the second channel may be amplified by the differential amplifier DA1. The amplified signal may be used for controlled the SSS.

For example, a signal from the shunt circuit 33' after being processed in the primary channel may be fed into the secondary channel. In the secondary channel, the signal may be pre-amplified, and the pre-amplified signal may be used to control the gate driver. For example, a magnitude of a voltage measured on the shunt circuit 33' may be in a microvolt range. Thus, the measured voltage may be pre-processed so as to be used by other circuits. For example, the measured signal in the micro voltage range may be amplified to use for over current protection. For example, the measured signal of the micro voltage range may be amplified by, e.g., a differential amplifier DA1 in the secondary channel of FIG. 6 such that the amplified signal may have a millivoltage range or a voltage range. The amplified signal may be proportional to an amount of the current passing through the shunt circuit 33'. For example, the amplified signal may be compared with a predefined overcurrent threshold by the differential amplifier DA1. The output of the differential amplifier DA1 may be used to control the gate driver 32' to drive the solid state switch (SSS) 31. For example, when the amplified signal is greater than the overcurrent threshold, the gate driver 32' may be turned off, the solid state switch (SSS) 31 may be turned off, and the output of the switching system 3 may be disconnected. Alternative, when the amplified voltage is not greater than the overcurrent threshold, the gate driver 32' may be turned on, the solid state switch (SSS) 31 may be turned on, and the input and the output of the switching system 3 may be connected.

In an example embodiment, for driving both the BMS and the solid state switch (SSS), the shunt circuit and/or the preamplifier DA1 in the secondary channel may also be used for the gate driver of the solid state switch (SSS). Further, filters may be adapted to the second channel. For example, for the gate driver of the solid state switch (SSS), a fast signal may be provided when a filter with a low corner frequency is provided for the secondary channel of the circuit of the BMS. For example, the fast signal may be generated by a cascade of opamps. For example, the cascade of the opamps may be used to convert the signal with different input Gain without a Programmable Gain Amplifier (PGA).

For example, opamp circuits may have advantages that the opamp circuits may be cascaded without changing their input-output relationships, because each opamp circuit may have infinite input resistance and zero output resistance.

Figure 6:
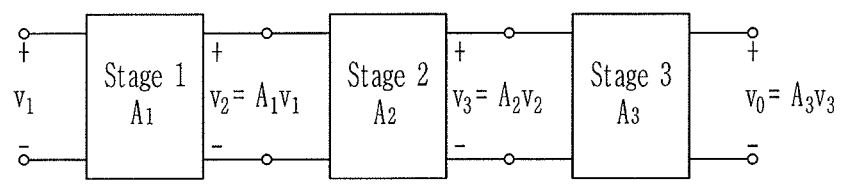
FIG. 6 illustrates operational amplifiers (opamps) with three-stages according to an example embodiment.

FIG. 6 illustrates a cascaded connection of three opamps in the form of a first opamp $A_1$, a second opamp $A_2$, and a third opamp $A_3$ arranged as a with three-stage cascade according to an example embodiment. Referring to FIG. 6, the cascade connection of the opamps in the case of FIG. 6 may amplify an input voltage $v_1$ by three gain stages (an output voltage $v_2$ of Stage 1 (opamp $A_1$) may be the input voltage $v_1$ amplified by the gain of the first opamp $A_1$, an output voltage $v_3$ of the Stage 2 (opamp $A_2$) may be the voltage $v_2$ amplified by the gain of the second opamp $A_2$, and an output voltage $v_0$ of the Stage 3 (opamp $A_3$) may be the voltage $v_3$ amplified by the gain of the third opamp $A_3$), and may provide a fast signal for the gate driver and provide at least one filter with a low corner frequency for the second current measurement.

For example, at least one second opamp may be cascaded and connected to an output of a first opamp (e.g. the differential amplifier DA1 in FIG. 5) via a terminal ISENSE_SEC. Further, at least one filter with the low corner frequency may not be realized by the first opamp (e.g. the differential amplifier DA1 in FIG. 5) but may be realized with the at least one second opamp in the cascade connection. For example, the first opamp (e.g., the differential amplifier DA1 in FIG. 5) may be a filter with high corner frequency to suppress high frequency noise. A signal output from the at least one second opamp may have similar properties as the signal output from the ISENSE_SEC of the circuit. Thus, a strongly filtered signal for the secondary channel and a lightly filtered signal (e.g., a fast signal) for a comparator of the overcurrent protection circuit, may be obtained. Further, to rearrangement of the at least one filter, gains of the opamps in the cascade connection may be rearranged to be optimally suited for the application. For example, the circuit may have gain of 50. For example, in the cascade arrangement, the gain may be split between the two opamps. For example, the first opamp may have a gain of 10 and the second opamp may have a gain of 5.

The above embodiments describe that a driver and/or a shunt circuit of a battery management system (BMS) may be used by a solid state switch (SSS). The components and modules may further include the current measurement circuit used for overcurrent protection and serial communication interfaces, For example, a power source, a controller area network (CAN) interface, a current measurement circuit including a shunt circuit in a BMS may also be used by a SSS. In a word, as long as at least one of components and modules of a BMS are used by a SSS, the overall cost for a battery system may be reduced.

In general, a driver for a MOSFET switch in a battery system may be usually implemented on a printed circuit board (PCB), in which the MOSFET is mounted. A driver for a battery management system (BMS) may be usually implemented on a PCB, in which the BMS is mounted. However, such an arrangement may increase a manufacturing cost because the MOSFET switch and the BMS is provided with independent drivers, respectively. In addition, each of the MOSFET switch and the BMS may be provided with some other components and modules, which may increase the manufacturing cost. However, the example embodiments may provide a battery system that includes a solid state switch (SSS) and a battery management system (BMS) including at least one gate driver and a shunt circuit. Further, as the SSS and the BMS share the at least one gate driver and the shunt, the battery system may overcome or reduce at least some of the drawbacks of a general battery system. Further, as at least one of components and modules of a BMS are used by a SSS, the overall cost for a battery system may be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the example embodiments.

What is claimed is:

1. A battery system, comprising:
a solid state switch (SSS), and
a battery management system (BMS) including a gate driver,
wherein:
the BMS includes a shunt circuit and a current measurement circuit,
the SSS and the BMS share modules that are used for both the SSS and the BMS, the modules include the shunt circuit and the current measurement circuit, the current measurement circuit comprises a first part connected to the shunt circuit via a primary channel and a second part connected to the shunt circuit, in parallel with the first part, via a secondary channel,
the first part performs a first current measurement using the shunt circuit,
the second part performs a second current measurement, independent of the first current measurement, using the shunt circuit, to provide a fast signal driving the SSS,
at least one of the gate driver and the shunt circuit is to control the SSS,
the SSS includes at least one set of anti-serially interconnected FETs, the at least one set of anti-serially interconnected FETs including a first FET and a second FET, wherein:
gate electrodes of the first and second FETs are electrically interconnected to each other,
source electrodes of the first and second FETs are electrically interconnected to each other,
a drain electrode of the first FET is electrically connected to a first terminal, and
a drain electrode of the second FET is electrically connected to a second terminal,
the gate driver of the BMS is connected with the SSS via a first driving line and a second driving line,
the first driving line is connected with gate electrodes of the first and second FETs,
the second driving line is connected with the source electrodes of the first and second FETs,
a resistor, a diode, and a capacitor are connected between the first driving line and the second driving line in parallel,
a cathode of the diode is connected to the first driving line, and
an anode of the diode is connected to the second driving line.

2. The battery system as claimed in claim 1, wherein:
the gate electrode of the first FET is electrically connected to the first driving line via a gate resistor,
the source electrode of the first FET is electrically connected to the second driving line directly, and
a gate-to-source resistor is between the source electrode and the gate electrode of the first FET.

3. The battery system as claimed in claim 1, wherein the gate driver and the shunt circuit are arranged in the BMS, wherein:
the gate driver has sensing pins, and
two terminals of the shunt circuit are connected to the sensing pins of the gate driver, respectively.

4. The battery system as claimed in claim 1, wherein the current measurement circuit includes the shunt circuit in the BMS, wherein the current measurement circuit is shared with the SSS and the BMS.

5. The battery system as claimed in claim 4, wherein:
the first part is connected to the shunt circuit through shunt terminals to perform the first current measurement to generate a first measured signal, and
the second part is connected to the shunt circuit through the shunt terminals to perform the second current measurement to generate a second measured signal.

6. The battery system as claimed in claim 5, wherein:
the first measured signal is used for controlling the BMS, and
the second measured signal is used for controlling the SSS.

7. The battery system as claimed in claim 5, wherein
an output signal of a first opamp of the second part controls the gate driver of the BMS such that the gate driver of the BMS drives the SSS.

8. The battery system as claimed in claim 7, wherein a cascade connection of opamps provides a fast signal for the gate driver of the BMS and provides at least one filter with a low corner frequency for the second part of the current measurement circuit.

9. The battery system as claimed in claim 8, wherein the cascade connection of the opamps further includes at least one second opamp, the at least one second opamp cascaded and connected to an output of the first opamp via a current sensing terminal, and wherein
the second opamp forms at least one filter by connecting the second opamp to the first opamp in a cascade.

10. The battery system as claimed in claim 1, wherein at least one of the modules includes a serial communication interface.

* * * * *